Oct. 8, 1940.   W. SCHAFER   2,217,236
PHOTOGRAPHIC EXPOSURE METER
Filed July 1, 1933   2 Sheets—Sheet 1

INVENTOR
Willy Schafer
BY
Ivan E. O. Konigsberg
ATTORNEY

Oct. 8, 1940.  W. SCHAFER  2,217,236

PHOTOGRAPHIC EXPOSURE METER

Filed July 1, 1938  2 Sheets-Sheet 2

INVENTOR
Willy Schafer
BY
Isaac E. L. Konigsberg
ATTORNEY

Patented Oct. 8, 1940

2,217,236

UNITED STATES PATENT OFFICE 2,217,236

PHOTOGRAPHIC EXPOSURE METER

Willy Schafer, Wetzlar, Germany, assignor, by mesne assignments, to Frank Dumur, Lausanne, Switzerland Application July 1, 1938, Serial No. 216,880
In Germany July 6, 1937

3 Claims. (Cl. 88—23)

This invention relates to improvements in exposure meters for photographic cameras of the type in which the incoming light rays from the object are contrasted and compared with the light rays from a standard constant source of light such as an electric lamp for instance and light weakening means such as neutral wedges are used to equal the light intensity in the fields of light from the objective and from the standard light for purposes of comparison.

The object of the invention is to provide an exposure meter of very simple novel construction and one which will not occupy much space.

With this object in view the invention is embodied in an exposure meter which includes two disk formed neutral wedges which are supported on a common shaft. The light weakening or light gradating property of each wedge runs in opposite directions. The optical arrangement is such that the neutral wedges are supported to move in or adjacent to the two light entrance pupils which are preferably of the same size.

In the accompanying drawings

Figure 1:
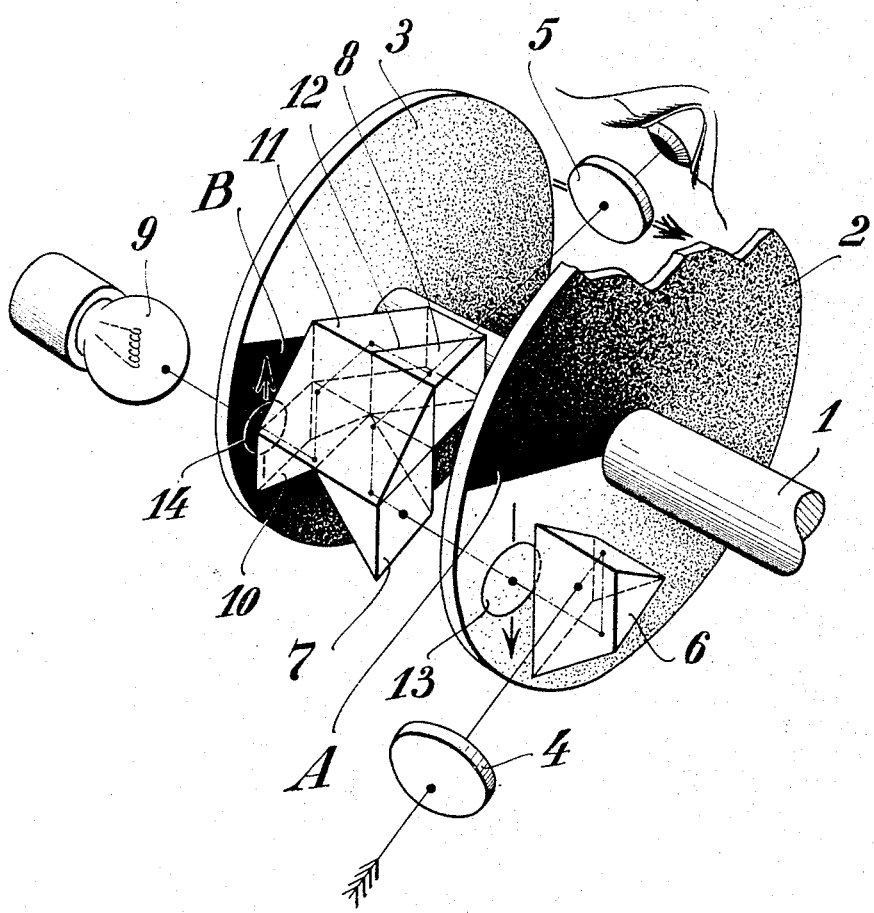
Fig. 1 is a diagram illustrating the arrangement of the main optical elements in the exposure meter.

Referring first to Fig. 1 the numeral 1 indicates an operating shaft upon which two disk formed neutral wedges 2 and 3 are mounted for operation as will be hereinafter described. As indicated in the drawings the density of the disk 2 is greatest at A and decreases in a clockwise direction, whereas the density of the disk 3 is greatest at B and decreases in anti-clockwise direction. The objective 4 and the ocular 5 together with the prisms 6, 7, and 8 form a telescopic view finder, the arrangement being such that the image is observed erect and with the right and left sides thereof in proper position.

The standard light is indicated at 9 in the form of an electric lamp from which the light rays pass through the entrance pupil at 14, which lies in the disk 3 and then through the prisms 10 and 11 to the partly silvered surface 12 in which said rays are united with the light rays from the object which come in through the objective 4 and pass through the prism 6, then through the entrance pupil 13, which lies in the disk 2 then through the prisms 7 and 8 and then join the rays from the lamp in the said silvered surface 12. From the latter the united rays pass to the ocular 5. It will be seen that by rotating the shaft 1 the light from the object is weakened or strengthened and to the same extent the lamp light is strengthened or weakened according to the direction of rotation. The correct exposure is indicated when the two bundles of light rays reach the same degree of intensity.

Figure 2:
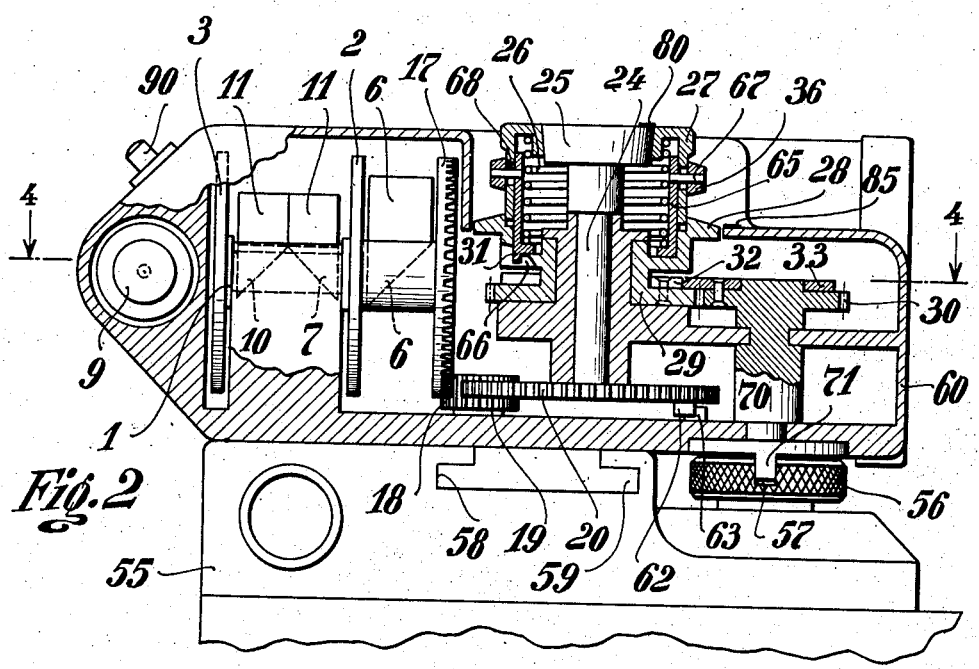
Fig. 2 is a rear view of the exposure meter in operative position upon a camera with parts in section and parts broken away.
Figure 4:
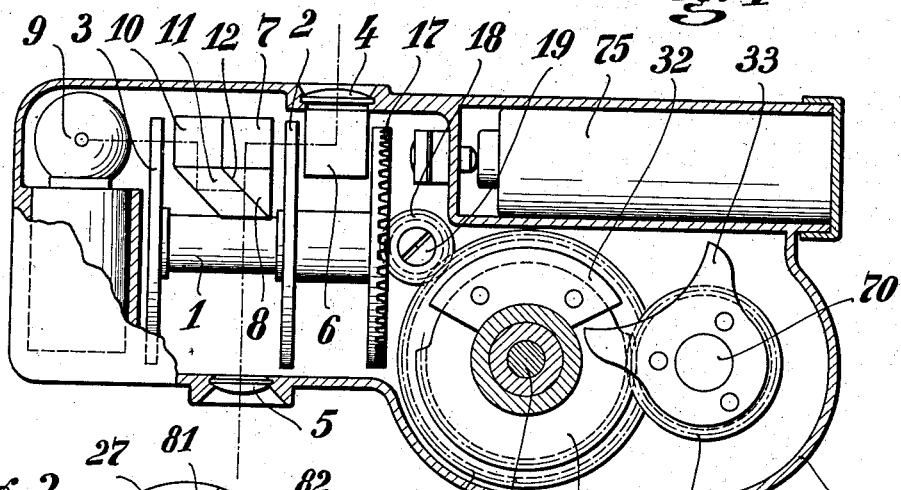
Fig. 4 is a plan view of the exposure meter with parts in section and parts broken away.
Figure 3:
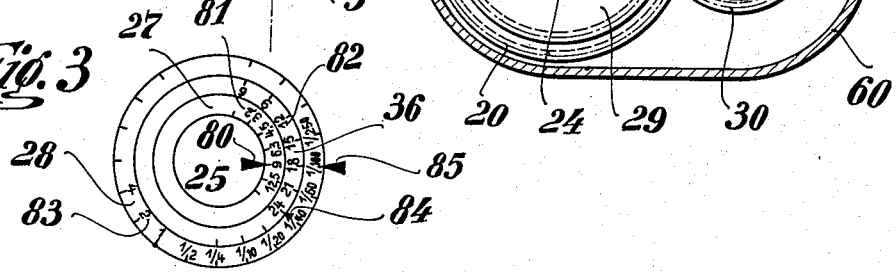
Fig. 3 is a view of the scale rings of the exposure meter.

The aforesaid optical elements may be embodied in an exposure meter of the type similar to that shown in my pending application Serial No. 204,965 filed April 29, 1938, as shown in Figs. 2, 3 and 4. Referring to the latter the reference numeral 55 denotes a modern miniature hand camera of a well known type. The camera is provided with the usual shutter setting knob 56 having a transverse slot 57. The camera also has an undercut recess 58 for the reception of a foot 59 on the bottom of the exposure meter casing 60. Within the latter the elements shown in Fig. 1 are arranged so as to be operable in connection with the shutter of the camera.

The shaft 1 is provided with a gear 17, which meshes with the pinion 18 upon a shaft 19. A toothed wheel 20 on the main operating shaft 24 engages the said pinion 18 to operate the gear 17 and the shaft 1. The toothed wheel 20 carries a stop pin 62 which engages a fixed stop 63 to limit the range of light weakening. The shaft 24 carries at the top a setting knob 25 to which a cylinder 27 is operatively coupled by a spring 26 the lower end of which presses against an inturned flange on a sleeve 65. The latter has a tooth 31 adapted to engage in notches 66 in a gear 29, the hub of which extends upward and carries a dial ring 28.

The sleeve 65 which surrounds the spring 26 is connected to an outer scale ring 36 by pins 67 which slide in slots 68 in the cylinder 27 as shown. The said gear 29 which rotates freely on the main shaft 24 is not a complete circle as shown in Fig. 4. It meshes with a smaller gear 30 upon a shaft 70 which engages the shutter setting knob 56 by means of a coupling key 71 in the slot 57 of the knob. The gear 29 carries an abutment 32 which is adapted to engage a cam 33 fast on the gear 30.

The lamp 9 is suitably connected to a dry battery 75 as shown in Fig. 4. A switch 90 may be used to turn the current on and off.

The knob 25 carries an index mark 80. The cylinder 27 carries a diaphragm scale 81. The ring 36 carries a Scheiner scale 82. The dial ring 28 carries a shutter scale 83. The ring 28 also has an index mark 84 and upon the casing of the exposure meter there is a fixed index mark 85.

The exposure meter is attached to the camera by pushing the foot 59 into the recess 58 and at the same time the coupling key 71 engages the shutter setting knob 56. The exposure meter may now be used to ascertain the diaphragm opening which is required for a particular exposure or it may be used to ascertain the exposure which is required for use with a particular predetermined diaphragm opening, all depending upon the nature of the object, the light conditions and the kind of photographic picture wanted.

As soon as the exposure meter is attached to the camera, it is set to accord with the Scheiner scale of the film. This is done as follows. The ring 36 and sleeve 65 is lifted against the pressure of the spring 26, the tooth 31 being thereby detached from a notch 66, and by rotation of the ring 36 the Scheiner index in scale 82 set opposite the Scheiner index mark 84 on the dial ring 28 which stands still. Then the ring 36 is released and the spring 26 will move it and the cylinder 65 down, the tooth 31 engaging in another notch 66 as will be understood.

Assuming now that the photographer has decided upon the exposure required under the circumstances and wishes to ascertain the corresponding correct diaphragm opening. He then first sets the exposure scale value in scale 83 opposite the fixed mark 85. This he may do by taking hold of the cylinder 27 which is coupled to the dial ring 28 by means of the inner cylinder 65 and then rotates cylinder 27 and the ring to bring the predetermined exposure value number opposite the mark 85. During this operation care must be taken that cylinder 27 is not depressed against the pressure of the spring 26. The setting of the exposure scale may also be accomplished by rotating the shutter setting knob 56 which is coupled to the dial ring 28 by shaft 70 and gears 30 and 29. This setting operation has of course included a certain small movement of the disk wedges 2 and 3 which rotate when dial ring 28 and shaft 24 is rotated as described.

The photographer now looks into the ocular 5, presses down upon cylinder 27 whereby to release the knob 25 so that the latter may be seized and rotated to operate the shaft 24 and through the aforesaid instrumentality rotate the disk wedges 2 and 3 until the light rays from the lamp and from the object coincide in intensity. Then the cylinder 27 is released and then the index mark 80 on the knob 25 will now be opposite a certain number on the diaphragm opening scale 81. The camera diaphragm is set accordingly and the picture is taken with the correct diaphragm opening for the exposure decided upon.

If on the other hand the photographer has decided upon the diaphragm opening and seeks the exposure value then the operation is as follows. The cylinder 27 is depressed and rotated until the predetermined diaphragm opening number in scale 81 is set opposite the index mark 80 on the knob 25 which stands still. Then the cylinder 27 is released. The photographer then again looks into the ocular 5 and also rotates the cylinder 27. This in turn causes rotation of the shaft 24 to operate the disk wedges 2 and 3 and also causes rotation of the dial ring 28. When the light seen in the ocular appears of even intensity, rotation is stopped and the correct exposure value in the scale 83 on dial ring 28 will now be found opposite the index mark 85. Simultaneous the shutter setting knob 56 has been rotated by means of the gears 29 and 30 and by the shaft 70 and the coupling key 71, so that the shutter is adjusted to the correct exposure value.

By very dark objects it is not always possible to obtain light coincidence, for instance if the diaphragm opening is 1.5 and the exposure is 1 second, these values being selected for purposes of illustrating the limit of automatic shutter operation of the camera. When this limit has been reached the shutter setting knob 56 can rotate no further and the two gears 30 and 29 are out of mesh and locked against further rotation by the engagement of the abutment 32 within the cam 33. The shutter is operated under time exposure according to the exposure value which now appears in the scale 83 opposite the index mark 85. At this time therefore, the operative limit of the shutter having been reached, the exposure has been automatically operatively uncoupled from the shutter and the latter is no longer operated automatically in the ordinary manner as when time exposure is used.

I claim:

1. An exposure meter including an electric lamp as a light contrasting measuring element, an ocular, an objective and a plurality of prisms including a partly silvered surface interposed between said ocular and objective and forming therewith a telescopic view finder, other prisms interposed between said lamp and the ocular for deflecting the light rays from the lamp into the path of the objective light rays to join the same in the said partly silvered surface, the joined bundles of light rays passing from said partly silvered surface to the ocular, a first disk formed neutral wedge in the path of the light rays from said objective, a second disk formed neutral wedge in the path of the light rays from said lamp and means for simultaneously rotating said two neutral wedges to simultaneously weaken the light rays from the lamp and to an equal extent strengthen the light rays from the objective and vice versa depending upon their direction of rotation, said neutral wedges being of variable density in opposite senses.

2. An exposure meter according to claim 1 characterized by that the first neutral wedge is located adjacent to the entrance pupil of the bundle of light rays from the objective and the second neutral wedge is located adjacent to the entrance pupil of the bundle of light rays from the lamp.

3. An exposure meter according to claim 1 wherein said means comprises a shaft for supporting and rotating the disk formed neutral wedges and mechanism for operating said shaft to simultaneously weaken the light rays from the lamp and to an equal extent strengthen the light rays from the objective and vice versa depending upon their direction of rotation.

WILLY SCHAFER.